United States Patent [19]
Conaway et al.

[11] Patent Number: 5,186,680
[45] Date of Patent: Feb. 16, 1993

[54] POULTRY DESKINNING APPARATUS

[75] Inventors: Everett T. Conaway, Seaford, Del.; Norma L. Conaway, P.O. Box 449, Seaford, Del. 19973

[73] Assignee: Norma L. Conaway, Seaford, Del.

[21] Appl. No.: 814,610

[22] Filed: Dec. 30, 1991

[51] Int. Cl.⁵ .............................................. A22C 21/00
[52] U.S. Cl. .................................... 452/125; 452/111
[58] Field of Search ............... 452/125, 142, 135, 111, 452/50

[56] References Cited

U.S. PATENT DOCUMENTS

| | | | |
|---|---|---|---|
| 3,613,154 | 10/1971 | Townsend | 17/62 |
| 4,024,602 | 5/1977 | Stiles | 452/50 |
| 4,183,117 | 1/1980 | Meyn | 452/111 |
| 4,340,995 | 7/1982 | Braeger | 17/62 |
| 4,378,613 | 4/1983 | Crouch | 17/62 |
| 4,382,313 | 5/1983 | Harben, Jr. et al. | 452/111 |
| 4,459,721 | 7/1984 | Hill | 17/11 |
| 4,570,293 | 2/1986 | Harben, Jr. et al. | 452/111 |
| 4,577,371 | 3/1986 | Simon | 17/62 |
| 4,610,051 | 9/1986 | Martin et al. | 17/11 |
| 4,697,307 | 10/1987 | Martin et al. | 17/11 |
| 4,723,339 | 2/1988 | Van De Nieuwelaar et al. | 17/11 |

Primary Examiner—Willis Little
Attorney, Agent, or Firm—Kenyon & Kenyon

[57] ABSTRACT

In a chicken deskinning device a pair of rollers is provided whereby one may be pivoted with respect to the other for defining a gap therebetween. The rollers terminate in a pair of blocks, each of which has an open end to allow the passage of chicken skin past the rear of the roller bearing blocks. A second set of rollers may be employed beneath the first set.

13 Claims, 6 Drawing Sheets

POULTRY DESKINNING APPARATUS

BACKGROUND OF THE INVENTION

Recent years have witnessed a significant rise in the per capita consumption of poultry. This increase has been accompanied by a decrease in the consumption of beef. Much of this increase in poultry consumption (generally chicken) can be attributed to a heightened awareness on the part of the consumer of the need to eat foods which are lower in fats, particularly animal fat. This has quite naturally lead to an increase in the consumption of poultry, which is lower in harmful fats than beef. Much of the fat contained in poultry is situated subcutaneously, i.e., at or beneath the skin. By removing the skin, one further reduces the quantity of fat and the caloric content of an already healthy food substance.

Originally, those wishing to prepare meals utilizing skinless chicken parts were dependent upon manual labor to remove the chicken skin. However, in time, machines were developed to automate this process so that today one can purchase machine deskinned chicken parts at the supermarket. Such machines must be economical for use in a mass production setting, and preferably should be flexible enough to handle a full range of chicken or other poultry parts. In addition, while being rapid and effective in separating skin from meat, such machines must not overly damage the meat itself, for this reduces the marketability of the product.

Finally, and of great importance, such a machine must be designed so that it is easy to clean. Poultry is a well known source of salmonella and other bacterial contaminants. Salmonella is a common contaminant carried in the gut of most poultry. During the slaughtering and dismemberment of chickens and other foul, the viscera unavoidably make contact with the surface of the bird, thereby contaminating the skin and other exposed parts. By removing the chicken skin, one at least partially removes some of the salmonella. However, this presents a special problem with respect to maintaining a deskinning apparatus in proper hygienic condition. Because salmonella is largely a phenomena of surface contamination (i.e., outside of the digestive tract, it is most commonly found on the skin), any apparatus that removes the skin must be designed so that it can be kept clean. Structural features of a deskinning machine which are of little import with respect to the purely mechanical action of deskinning can take on great importance when considered in view of the need to maintain a clean work environment.

U.S. Pat. No. 4,723,339 to Van de Nieuwelaar et al. teaches a deskinning apparatus which uses transverse pinch roles 10a and 10b with helical teeth. These helical rolls counterrotate and are used to grip and tear skin from the underlying tissue. However, this device is not suitable for use on individual parts, and requires separate structure to move the chicken across the rolls. The patent to Hill, U.S. Pat. No. 4,459,721 (hereby incorporated by reference), teaches a device to deskin individual chicken parts. However, it relies on blind bearing blocks separated by a narrow gap and a shear section for separating the skin from the chicken, both of which are very difficult to clean. This may present a heightened risk of contamination from salmonella and other microbes as noted above.

This invention is directed towards the further refinement of a versatile, economical chicken and other poultry deskinning apparatus that is easy to clean and effective to use.

SUMMARY OF THE INVENTION

This invention provides a chicken (or other poultry) deskinning apparatus in which skin is separated from the underlying meat by the action of a pair of motor driven, counter-rotating, helically geared rollers. The rollers terminate at their outfeed ends at a pair of open ended bearing blocks known as "back blocks". Any chicken skin that has adhered to the rollers will be extruded through these back blocks as the rollers counter-rotate, and so does not accumulate on the machine as it would were the rollers to terminate at their outfeed ends in a blind recess. A second pair of rollers may be disposed beneath the first pair of rollers to accommodate higher production speeds. The device includes various additional features for transporting chicken parts to and from the deskinning station. Further features, advantages, and embodiment of the invention are apparent from consideration of the following detailed description and claims.

DETAILED DESCRIPTION

Figure 1:
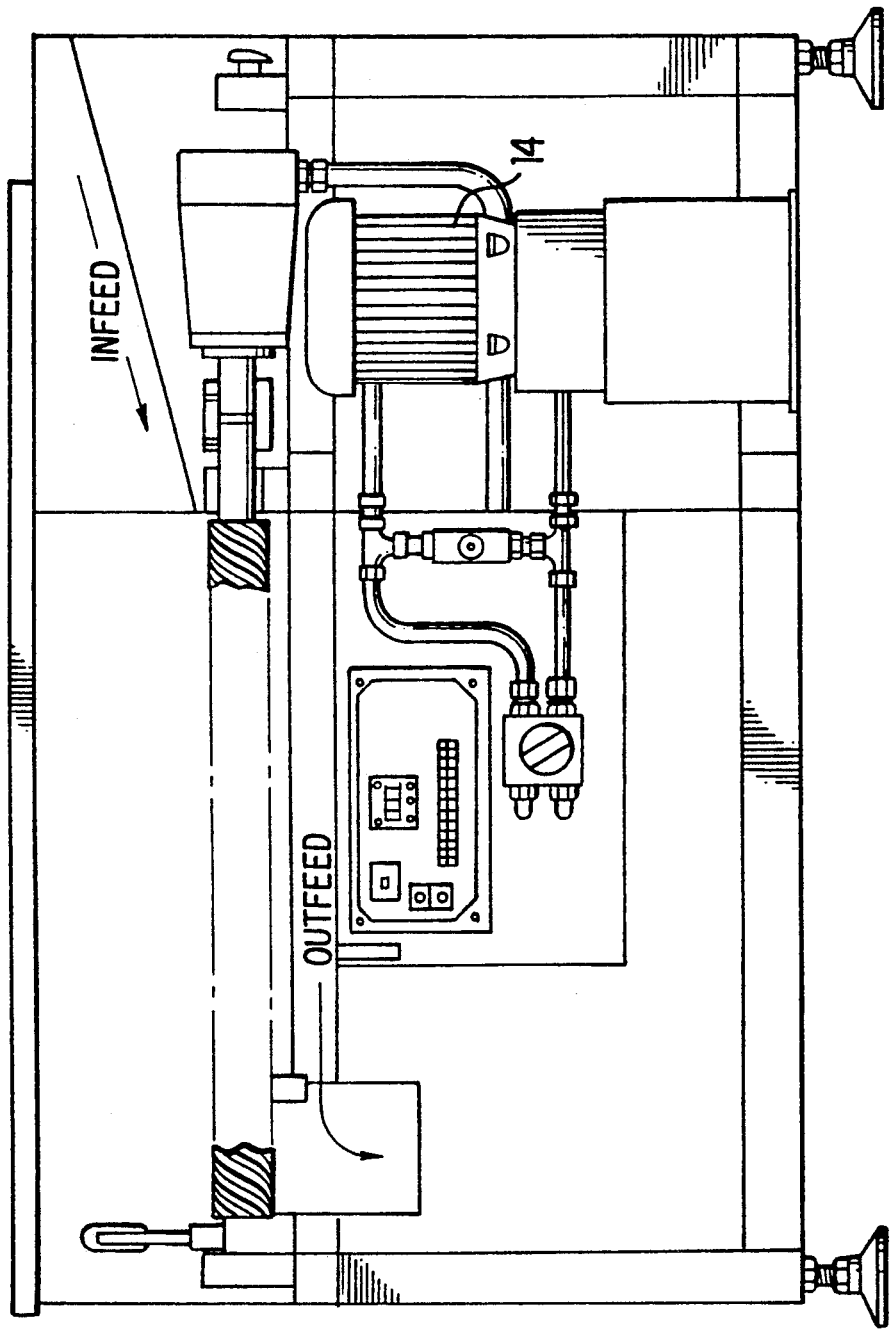
FIG. 1 is a plan view of the principle elements of a deskinning apparatus.
Figure 2:
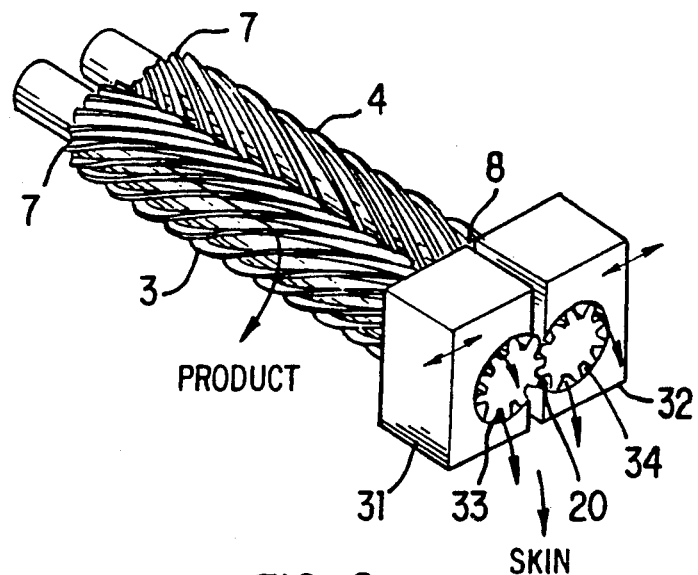
FIG. 2 is a perspective view of the rollers and back blocks constructed according to the principles of the invention.
Figure 2A:
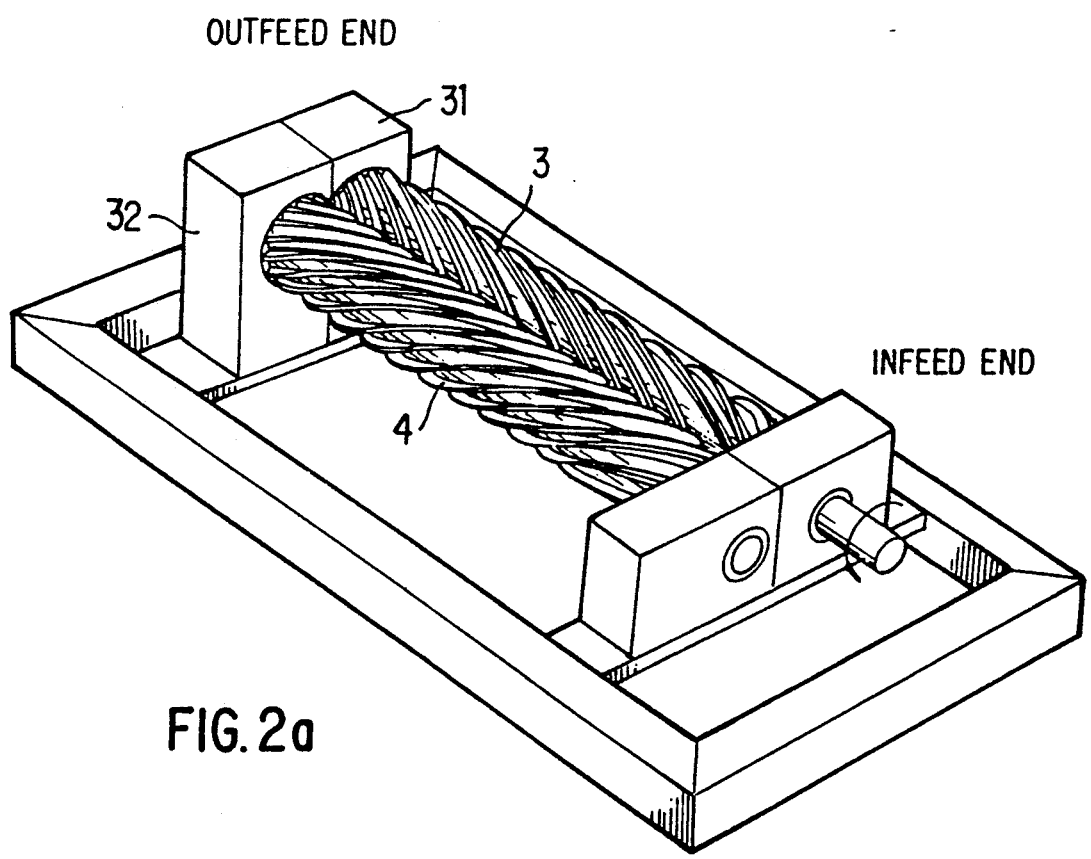
FIG. 2a is a simplified perspective view of one possible mounting arrangement for the rollers.

FIG. 1 shows the general arrangement of elements of a deskinning machine. At the heart of the machine is the deskinning station (FIG. 2). The deskinning station is made up of a pair of counter-rotating helical rollers 3 and 4 driven by an electric motor 14. These rollers are defined by an infeed end 7 and an outfeed end 8, and are typically 36 inches in length, depending on the poultry parts with which they are used. A motor drives one of these rollers at its infeed end; this roller in turn drives the second roller through the gearing provided by their contacting helical teeth. Both the rate at which the rollers rotate and the rate at which chicken parts are fed to the roller may be adjusted by the operator. At least one of the rollers (generally the roller that is not directly driven by the motor) is pivotable about a point at its infeed end. This allows the machine operator to establish a wedge-like gap between the two rollers from the infeed end to the outfeed end through which chicken skin may fall. This feature also allows one to compensate for the change in tooth geometry which inevitably results from wear, by moving one roller nearer the other.

As the chicken moves along the rollers, the counter-rotation and the helical cut of the teeth act to propel the chicken part forward as the skin is worked free from the underlying meat. The chicken skin will then often fall through the gap between the rollers to an underlying waste bin. However, some of the separated skin may adhere to the rollers. This skin will be propelled forward along the rollers towards the outfeed end.

The rollers are supported in bearing blocks 31 and 32 known as open back blocks. These bearing blocks 31 and 32 or open back blocks, as their name suggests, is provided with cylindrical through hole 33 and 34 respectively, extending from end to end. These through holes serve both to accommodate the insertion of a roller and to enable any chicken skin which has not fallen through the longitudinal gap between the rollers to be extruded out the rear or outfeed end of the bearing blocks. At least one of these back blocks may be laterally displaceable with respect to the other. The displaceable back block is associated with a roller which is pivotable about at its infeed end. By moving the back block, one can open or close a wedge like gap between the rollers. The gap is at a minimum at the outfeed end of the rollers. The chicken skin which fails to fall through this gap after it has been pried away from the chicken part by action of the rollers instead adheres to the rollers and is propelled forward by their rotation. When these portions of skin reach the rear openings of the back blocks, they are extruded out as shown in FIG. 2. This arrangement provides for a more hygienic device than is generally obtained when one uses blind back blocks to support the rollers. (The closed recesses within blind back blocks tend to accumulate chicken skin and are difficult to clean.)

Figure 9:
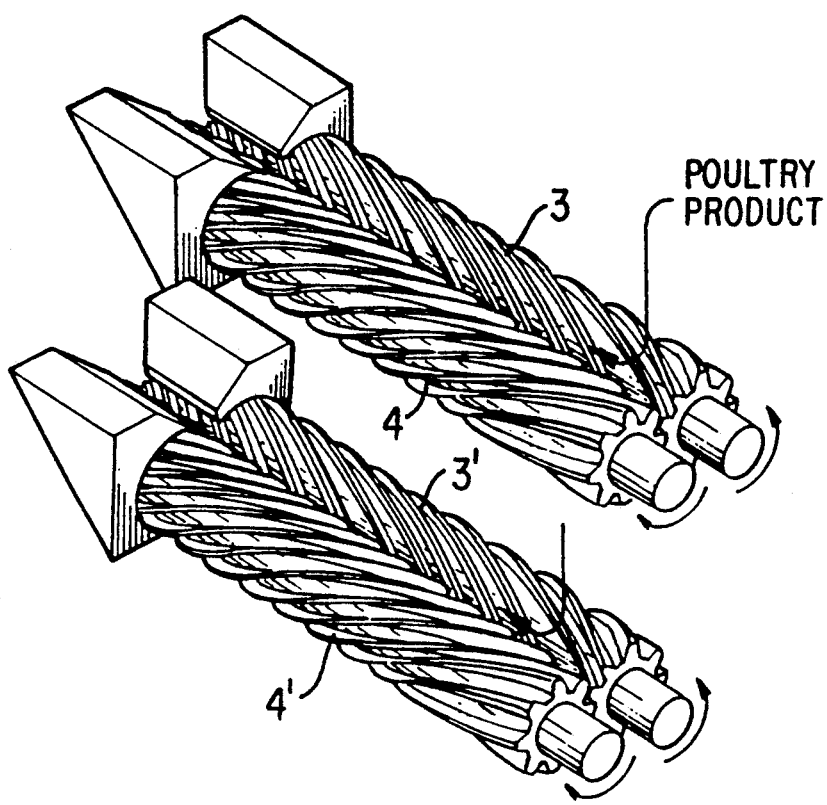
FIG. 9 is a perspective view of the rollers of a further embodiment, in which dual sets of rollers are employed.

At high rates of production (particularly of large parts), the skin may not be detached rapidly enough from the cutting rollers and jamming may ensue. This problem can be solved by providing a second set of rollers spaced directly beneath and running at twice the speed of the upper set to move rapidly pull off any attached skin (FIG. 9).

Figure 3:
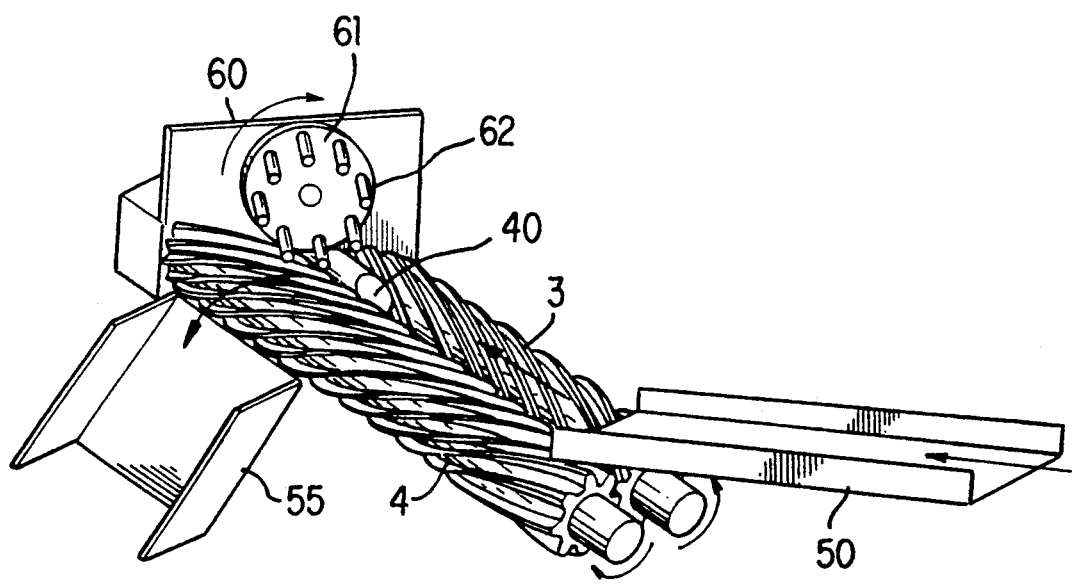
FIG. 3 shows these elements in conjunction with infeed and outfeed chutes, lift off wedge, cogged wheel and knock off wedge.
Figure 4:
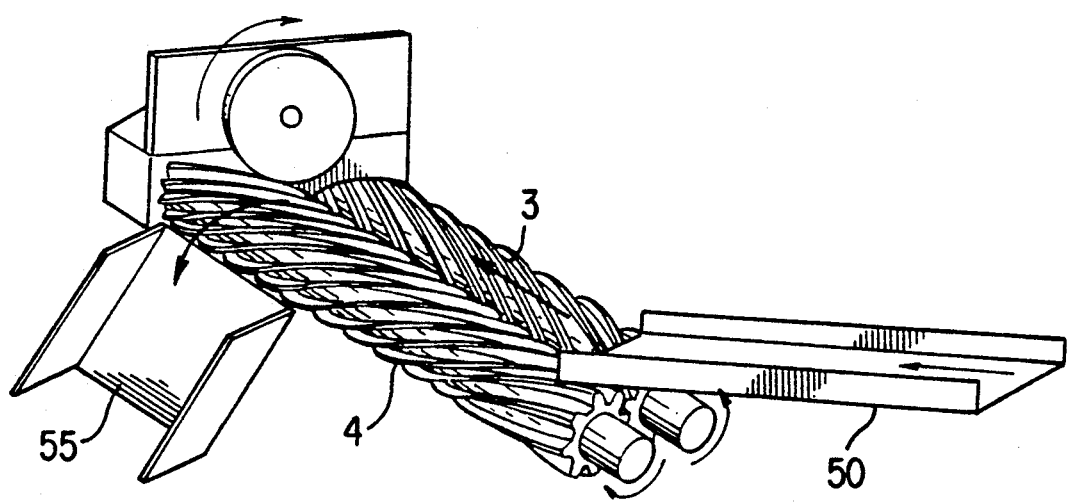
FIG. 4 shows an alternative embodiment to FIG. 3, in which the knock-off wheel lacks cogs.
Figure 5:
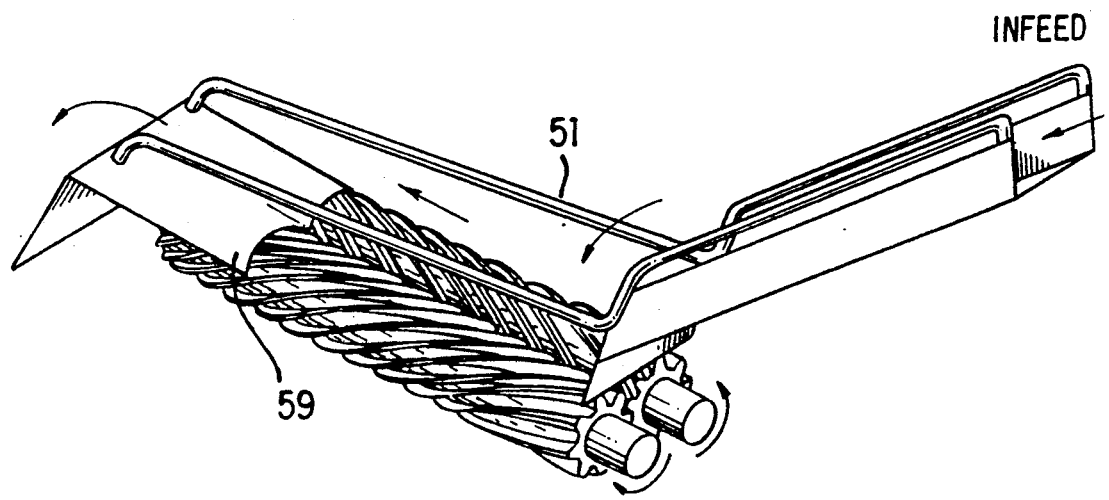
FIG. 5 is a perspective view of an alternative embodiment directed towards a deskinning machine for use with a whole breast and attached wings.
Figure 6:
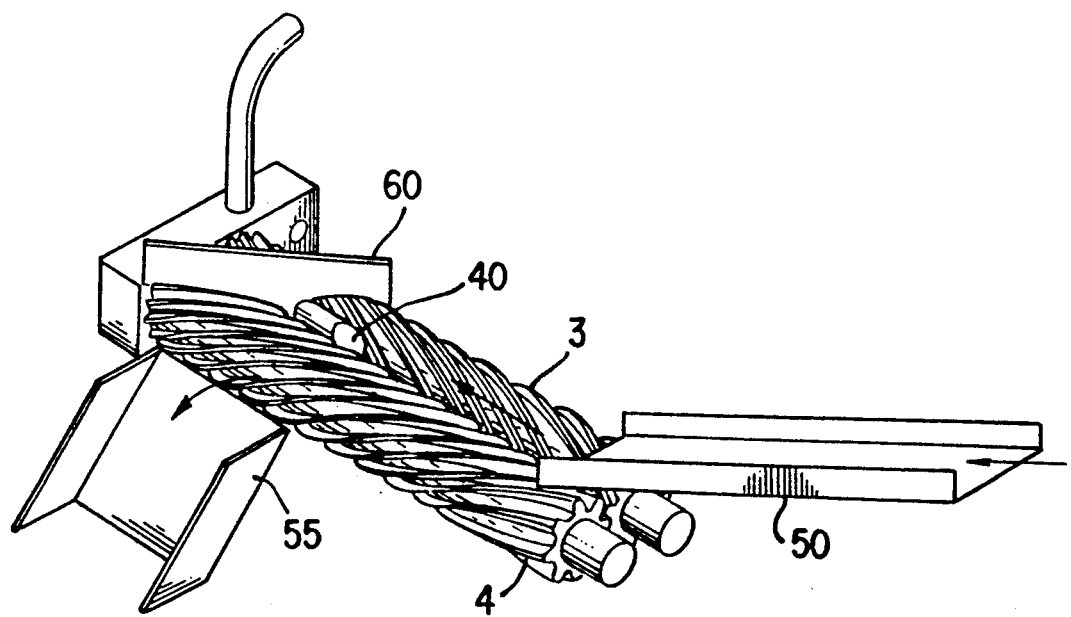
FIG. 6 shows a leg deskinner utilizing an infeed shoot, an outfeed shoot, a knock off wedge, and a diverting wedge.

The precise configuration of parts employed about the rollers is generally a function of the type of poultry part being deskinned. An infeed chute 50 and an outfeed chute 55 may be provided to transport poultry parts to and from the deskinning station (see FIG. 6). In other embodiments, this may be combined with side rails 51 to transport a whole breast and attached wings (FIG. 5) as part of an overhead conveyor system. At the outfeed end may be provided a diverting, or "lift-off" wedge 40 for lifting the meat up from the rollers, and a knock-off wedge 60 for deflecting the skinned poultry part off the rollers (see FIG. 6). Where a whole leg, thigh, or drumstick is being deskinned, it may be desirable to provide a knock-off wedge 60 and rotating cogged wheel 61 that is angled with respect to the longitudinal axis of the feed direction, for knocking deskinned chicken parts off of the rollers (FIG. 3). Alternatively, such a device may use a wheel lacking cogs (figure 4). The knock-off wedge is set at an elevation above the rollers to allow the detached skin to move beneath the wedge and continue on towards the outfeed end of the rollers. FIG. 5 illustrates the use of the side rails 51 for deskinning a whole breast and attached wings. In this embodiment, the wing rails are used to guide the chicken breast along the rollers as they are being deskinned. The outlet end of the rollers is covered by a cover 59 spaced above the rollers at a distance sufficient to allow the chicken skin to pass underneath.

In the case of a leg deskinner, both a diverting wedge and a knock off wedge may be employed.

FIG. 3 illustrates the combination of certain of the aforementioned additional elements, such as inlet chute 50 and outlet chute 55. This embodiment also utilizes the so-called lift-off or diverting wedge 40 which helps lift the chicken part off and away from the rollers. The embodiment also shows the use of a knock off wedge 60 diagonally arrayed with respect to the rollers and spaced above them a distance sufficient to allow skin to pass beneath. The removal of the chicken part from the rollers may be further facilitated by the provision of a motor driven knock-off wheel 61 (see FIG. 4), which may have cogs 62 (FIG. 3). The wheel and cogs rotate, so that as the poultry parts arrive at the wheel by the propulsive action of the rollers, they are knocked off the rollers by the action of the wheel and cogs (if present). Alternatively, the knock-off wedge may be used without the wheel. The prompt removal of the poultry part as soon as it has been deskinned serves to minimize damage to the underlying meat that might occur if the part were allowed to ride the full length of the rollers.

Figure 7:
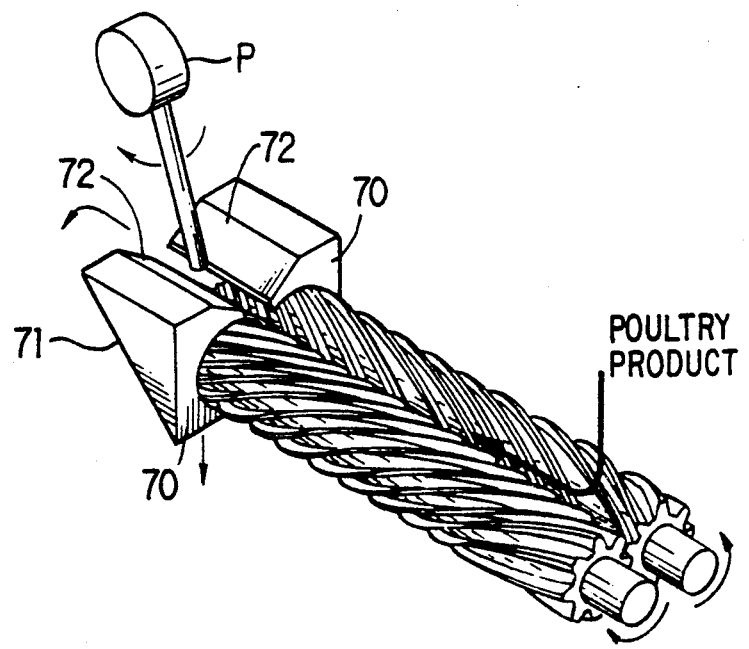
FIG. 7 shows an alternative embodiment of a deskinner for use with boneless product.

FIG. 7 illustrates an alternative embodiment especially well suited for use with boneless products. Boneless products present a greater challenge in that they have less structural rigidity. The boneless product deskinner utilizes a pair of bearing back blocks 70 cut from below on a diagonal 71 to allow skin to fall out the bottom of the blocks. The bearing blocks are arranged so that they extend past the rollers approximately the length of the product. At their upper surface 72, the two blocks together form a V-shape to allow the product to come to rest at the end of the blocks. The spacing between the blocks is just sufficient to allow any protruding skin to be ground through the rollers while protecting the boneless meat. A rotating pusher P is utilized to displace the product off of the blocks when or if such is required.

Figure 8:
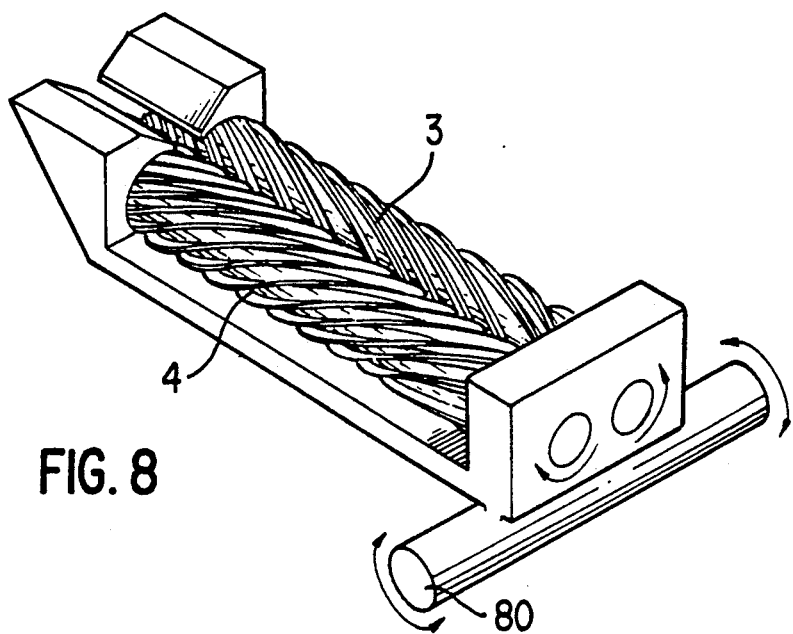
FIG. 8 provides a perspective view of a deskinner for use with line delivered products of varying sizes.

In the embodiment shown in FIG. 8, the deskinning station is mounted on pivots 80 and spring or counterbalanced. The rollers are mounted on pivots at their infeed end so that they can be set at an acclivity (upward incline) of approximately 10 degrees. Chicken product is fed to the rollers by cones or along a horizontal conveyor which generally holds poultry parts suspended from a common height with respect to their top-most surfaces. Because large parts will protrude downwards from this common height a greater distance, they will make contact with the helical teeth before the smaller parts make contact. Hence, large poultry parts, which take longer to deskin, are exposed to a greater portion of the deskinning rollers (and hence a longer period of contact) than smaller products, which require less time on the rollers. As in the other embodiments, the outfeed bearing blocks have a through-hole for the free passage of chicken skin.

What is claimed is:

1. A deskinning apparatus, comprising:
   two helically toothed rollers having a first infeed end, and a second outfeed end, said rollers being in operative engagement with each other at at least one end;

two bearing means for supporting said rollers at their infeed ends;

a pair of open ended back blocks for supporting said rollers at their outfeed ends, each back block having a through hole traversing each of said back blocks, and each back block being penetrated by the toothed portion of one of the helically toothed rollers so that at least a portion of the toothed portion of the helically toothed roller in the back block substantially traverses the length of said through hole;

means for driving at least one of said rollers so that the rollers move in a counter-rotating fashion; and means for delivering product having skin to the infeed end and means for removing product from the apparatus once its skin has been removed, whereby skin is pried loose from the product as it moves along the rollers.

2. The device of claim 1, further comprising a knock off wedge disposed at an angle with respect to the rollers, whereby the knock off wedge serves to remove skinned product from the rollers.

3. The device of claim 2, further comprising a rotating wheel attached to the knock off wedge for further assisting in the removal of skinned product from the rollers.

4. The device of claim 3, wherein the wheel further comprising cogs protruding orthogonally from the wheel.

5. The device of claim 1, further comprising a wedge disposed above and directed along the line of contact between the 6. The device of claim 1, wherein the back blocks have bevelled surfaces defining an open "V" shape therebetween.

7. The device of claim 1, wherein the rollers are pivotable in conjunction with a restorative force about a horizontal line at their infeed so that the rollers may form an angle with respect to the horizontal as product is delivered to the rollers for deskinning.

8. The device of claim 7, wherein the angle is about 10 degrees.

9. The device of claim 1, wherein one of the blocks is laterally displaceable with respect to the other at the outfeed end, and is pivotable at its other end so that one may selectively open and close a wedge between the two rollers.

10. The device of claim 1, further comprising a second set of two helically toothed rollers, said second set of rollers being spaced below and generally parallel with the other rollers.

11. A deskinning apparatus, comprising:

two helically toothed rollers having a first infeed and and a second outfeed end, said rollers being in operative engagement with each other at at least one end;

two bearing means for supporting said rollers at their infeed ends;

a pair of open ended bearing blocks for supporting said rollers at their outfeed ends, each back block having a through hole traversing said bearing block for penetration by one of said helically toothed rollers, said through holes having a diameter slightly greater than the outer diameter of the helically toothed rollers to accommodate said toothed roller;

means for driving at least one of said rollers so that the rollers move in a counter-rotating fashion; and means for delivering product having skin to the infeed end and means for removing product from the apparatus once its skin has been removed, whereby skin is pried loose from the product as it moves along the rollers and skin that has adhered to the rollers is extruded through the holes in the end blocks.

12. The device of claim 11, wherein the bearing blocks have bevelled surfaces defining an open "V" shape therebetween, said bearing blocks extending beyond the length of the rollers.

13. A deskinning apparatus, comprising:

a first pair of helically toothed rollers having a first infeed end, and a second outfeed end, said rollers being in operative engagement with each other at at least one end;

two bearing means for supporting said rollers at their infeed ends;

a pair of open ended back blocks for supporting said rollers at their outfeed ends, each back block having a through hole traversing said back blocks that is large enough to accommodate the full diameter of a roller;

means for driving at least one of said rollers so that the rollers move in a counter-rotating fashion;

means for delivering product having skin to the infeed end and means for removing product from the apparatus once its skin has been removed; and a second pair of helically toothed rollers disposed beneath and generally parallel to the first pair of rollers, whereby skin is pried loose from the product as it moves along the rollers.

* * * * *

UNITED STATES PATENT AND TRADEMARK OFFICE
CERTIFICATE OF CORRECTION

PATENT NO. : 5,186,680
DATED : February 16, 1993
INVENTOR(S) : Conaway et al

It is certified that error appears in the above-indentified patent and that said Letters Patent is hereby corrected as shown below:

```
Abstract, line 1, change "device a pair" to --device, a pair --.
Column 1, line 12, change "naturally lead to" to --naturally led to --.
Column 1, line 33, change " well known source" to --well-known source --.
Column 1, line 36, change "and other foul" to --and other fowl --.
Column 2, line 9, 10, change "pair of open/ended" to --pair of open-ended --.
Column 2, line 33, change "lift off wedge," to --lift-off wedge --.
Column 2, line 34, change "knock off wedge" to --knock-off wedge --.
Column 3, line 16, change "suggests, is/" to --suggests, are/ --.
Column 3, line 17, change "through hole 33" to --through holes 33 --.
Column 3, line 27, change "wedge like gap" to --wedge- like gap --.
Column 3, line 45, Delete "move".
Column 3, line 76, Begin new paragraph at "FIG. 5 illustrates --.
Column 4, line 8, change "knock off wedge" to --knock-off wedge --.
Column 4, line 14, change "knock off wedge" to --knock-off wedge --.
Column 5, line 19,20 change "a knock/off" to --a knock-off --.
Column 5, line 21, change "knock off wedge" to --knock-off wedge --.

Column 5, line 24, change "knock off wedge" to --knock-off wedge --.
Column 5, line 32, change "between the" to --between the rollers --.
```

Signed and Sealed this

Twenty-eighth Day of December, 1993

Attest:

BRUCE LEHMAN

*Attesting Officer*  *Commissioner of Patents and Trademarks*